United States Patent [19]

Bournonville et al.

[11] Patent Number: 4,548,918

[45] Date of Patent: Oct. 22, 1985

[54] PROCESS FOR MANUFACTURING A HYDROCARBON CONVERSION CATALYST AND CATALYST PREPARED BY SAID PROCESS

[75] Inventors: Jean-Paul Bournonville, Chatou; Chan T. Dinh, Le Vesinet, both of France

[73] Assignee: Societe Francaise des Produits pour Catalyse Pro-Catalyse, Rueil-Malmaison, France

[21] Appl. No.: 607,110

[22] Filed: May 4, 1984

[30] Foreign Application Priority Data

May 5, 1983 [FR] France ................................. 83 07669

[51] Int. Cl.$^4$ ............................................. B01J 31/28
[52] U.S. Cl. ..................................... 502/154; 502/152
[58] Field of Search ....................... 502/152, 154, 227

[56] References Cited

U.S. PATENT DOCUMENTS 4,049,581 9/1977 Itoh et al. ............................ 502/227

Primary Examiner—W. J. Shine
Attorney, Agent, or Firm—Millen & White

[57] ABSTRACT

The invention concerns the manufacture of a solid acid catalyst comprising: (a) a carrier, (b) a metal of the platinum family and (c) an additional metal selected from tin, germanium and lead. Halogen may be present.

The additional metal is added to the catalytic mass dissolved in a hydrocarbon solvent, in the form of an organometallic compound, for example tetrabutyl tin.

The invention is particularly applicable to the manufacture of catalysts for hydrocarbon reforming or aromatic hydrocarbons production.

13 Claims, No Drawings

PROCESS FOR MANUFACTURING A HYDROCARBON CONVERSION CATALYST AND CATALYST PREPARED BY SAID PROCESS

The invention concerns a process for manufacturing solid catalysts for hydrocarbons conversion.

These catalysts comprise a carrier, at least one noble metal of the platinum family (since platinum is necessary, it may be used optionally in the presence of another metal of the platinum group), an additional metal selected from tin, germanium and lead and a halogen or halogenated compound.

These catalysts are particularly useful in catalytic reforming as well as in a catalytic process for manufacturing aromatic hydrocarbons, said processes being conducted for example at a temperature from 400° to 600° C., under an absolute pressure from 0.1 to 3.5 MPa, at a hourly velocity from 0.1 to 10 volumes of liquid charge per volume of catalyst, the molar ratio hydrogen/hydrocarbons being from 1 to 20. The catalysts prepared according to the invention may be used to perform these processes under severe conditions. Thus, the use of the catalysts is particularly convenient for:

reforming reactions in order to obtain a gasoline of clear octane number of at least 102. The severe conditions of the catalytic hydroreforming reactions are particularly the following:

Average temperature from about 510° to 580° C., pressure from about 0.5 to 1.8 MPa, preferably 0.6 to 1.3 MPa, hourly velocity from 1 to 10 volumes of liquid charge per volume of catalyst and recycle rate from 6 to 10 moles of hydrogen per mole of charge. The charge is generally a naphtha distilling between about 60° C. and about 220° C., particularly a straightrun naphtha, reactions for producing aromatic hydrocarbons from saturated or unsaturated gasolines (for producing benzene, toluene and xylenes). When treating an unsaturated charge, i.e. a charge containing diolefins and monoolefins, the charge must be first made free thereof by selective or total hydrogenation. Then the charge, optionally free of substantially all the diolefins and monoolefins contained therein if any, is subjected to a hydrogen treatment in the presence of a catalyst at a temperature from about 480° to 600° C., under a pressure from 0.1 to 1.3 MPa, the hourly flow rate by volume of the liquid charge being about from 1 to 10 times the catalyst volume, the molar ratio hydrogen/hydrocarbons being about 6 to 20. The charge may consist of gasolines obtained by pyrolysis, cracking, particularly steam-cracking, or catalytic reforming, or it may consist of naphthenic hydrocarbons, liable to be converted, by dehydrogenation, to aromatic hydrocarbons.

The catalysts of the invention are also convenient for the isomerization of aromatic hydrocarbons (e.g. xylenes), which reactions are usually conducted at a temperature from about 200° to 600° C., under a pressure from about 0.005 to 7 MPa, the hourly flow rate by volume being from 0.1 to 10 times the catalyst volume.

The catalysts according to the invention are also convenient for isomerizing, in hydrogen atmosphere, saturated hydrocarbons comprising 4 to 7 carbon atoms, at a temperature from 50° to 250° C., for example 100°–200° C. The operation is preferably conducted under a pressure from 0.5 to 10 MPa, at a space velocity from 0.2 to 10 liters of charge per liter of catalyst and per hour. The molar ratio $H_2$/hydrocarbons is, for example, from 0.01:1 to 20:1.

The catalysts according to the invention are also useful for aromatic hydrocarbons hydrodealkylation or steamdealkylation, these reactions being conducted under known operating conditions, generally between 300° and 600° C., so as to produce benzene from toluene or from other alkylbenzenes.

BACKGROUND OF THE INVENTION

Acid catalysts containing, in addition to a carrier, a noble metal of the platinum family and at least one additional metal selected from the group consisting of tin, germanium and lead, have been known for a long time. Thus they are disclosed in the French Pat. No. 2,031,984.

The carriers are generally selected from oxides of metals from groups II, III and/or IV of the periodic classification of elements, such for example as the oxides of magnesium, aluminum, titanium, zirconium, thorium or silicium, either alone or admixed with one another or with oxides of other elements of the periodic classification, such as boron. Coal also can be used. Other carriers may consist of zeolites or molecular sieves of the X or Y type, of the mordenite or faujasite type or of the ZMS-5, ZMS-4, ZMS-8 type etc. . . . or of mixtures with zeolite material of oxides of metals from groups II, III and/or IV.

The preferred carrier for the reactions of reforming, of aromatic hydrocarbons production or of isomerizing paraffinic or aromatic hydrocarbons, is alumina, advantageously of a specific surface from 50 to 600$m^2$ per gram, preferably from 150 to 400$m^2$/g.

The catalyst is usually prepared by a conventional method consisting of impregnating the carrier by means of solutions of compounds of the metals to be introduced. The impregnation may be performed with a common solution of these metals or with a separate solution for each metal. When using several solutions, intermediate drying or calcination steps may take place. Usually, a final calcination is conducted, for example at a temperature from about 500° to 1000° C., preferably in the presence of free oxygen, for example by air scavenging.

Platinum (and optionally another noble metal from the platinum group) may be incorporated in the carrier by impregnating said carrier with an adequate aqueous or non aqueous solution containing a salt or a compound of the noble metal. Platinum is generally introduced into the carrier as chlorophatinic acid.

The element selected from the group consisting of tin, germanium and lead, may be introduced as metal compound such as a tin chloride, bromide or nitrate, a lead halide, nitrate, acetate or carbonate, germanium chloride or oxalate in aqueous solution etc....

The halogen of the catalyst may originate from one of the metal halides when the metal is introduced as halide or it may be introduced as hydrochloric acid or hydrofluoric acid, ammonium chloride, ammonium fluoride, chlorine gas or a hydrocarbon halide, e.g. $CCl_4$, $CH_2Cl_2$ or $CH_3Cl$ etc. . . .

OBJECT OF THE INVENTION

It has now been found, and this is an object of the present invention, that the additional metal (tin, germanium or lead) can be introduced, according to a new method, as an organic compound selected from the group consisting of tin, germanium or lead alkyls, cycloalkyls, aryls, alkylaryls, arylalkyls in hydrocarbon solutions. Organo-halogenated compounds of these metals can also be used. Preferred compounds are: tin-tetrabutyl, tin-tetramethyl, germanium-tetrapropyl, lead-tetraethyl, tin-diphenyl, germanium-diphenyl or lead-tetraphenyl.

The impregnation solvent is selected from the group consisting of paraffinic, naphthenic or aromatic hydrocarbons containing 6 to 12 carbon atoms per molecule, such as, for example, n-heptane, methylcyclohexane and toluene. Mixtures of the above-mentioned solvents may also be used.

Nowadays, efforts are still being made to find new catalysts which, on the one hand, would give better yields than those available up to now and which, on the other hand, would have a longer life time than the known catalysts. In addition, an effort is made to improve the mechanical properties of such catalysts, particularly for their use in moving bed, as conglomerates, e.g. balls or extrudates of large size, so as to leave a relatively easy passage to the gaseous reactants. The wear of these catalysts results in the formation of much thinner particles which progressively obstruct the free space and thereby requiring an increase in the feed pressure of the reactants or even leading to a shutdown of the operation.

SUMMARY OF THE INVENTION

It has now been discovered that, in their conditions of use, the catalysts according to the invention have an increased activity and a longer life time, as compared with the catalysts of the prior art prepared by conventional techniques.

The catalysts according to the invention comprise, in proportion of the carrier, (a) 0.01 to 2%, more particularly 0.1 to 0.5%, of at least one noble metal of the platinum family, platinum being always present, (b) from 0.005 to 0.3%, preferably 0.01 to 0.2% and more particularly 0.02 to 0.09% of tin, germanium and/or lead, and (c) from 0.1 to 15% by weight, preferably 0.7 to 3% and more particularly 0.9 to 2.8%, with respect to the carrier, of halogen, for example chlorine or fluorine. (The indicated metal proportions are calculated as metal element).

The process according to the invention makes possible the use of catalysts whose tin, germanium or lead content is advantageously lower than in the prior art.

Thus, particular examples of catalysts prepared according to the invention and containing platinum and tin, have a lower tin content than that required in the prior art according to which the tin content by weight is often preferably from 0.05 to 0.6% (see French Pat. No. 2031984), whereas in the examples of the present specification a tin content as low as 0.02 to 0.09% or even 0.045% is sufficient.

In the process according to the invention, at the end of the step of the catalysts preparation, the latter are generally calcined at a temperature from 450° to 1000° C., but the catalyst, after calcination, may be advantageously subjected to an activation treatment with hydrogen at high temperature, for example 300°–500° C., so as to obtain a more active metal phase. This hydrogen treatment is performed, for example, by slowly increasing the temperature under hydrogen stream up to the maximum reduction temperature, comprised for example between 300° and 500° C. and preferably, between 350° and 450° C., this temperature being then maintained for 1 to 6 hours.

It is also possible, and this is a preferred technique to incorporate platinum or a metal of the platinum family into the carrier, to calcine and optionally reduce with hydrogen as above mentioned, and then to incorporate the additional element selected from tin, germanium and lead, with an optional calcination at the end of the introduction of the additional metal, optionally followed with a reduction of the resultant catalyst.

Another preferred method of preparing the catalyst is operated as follow:

(a) The carrier is impregnated with an acid solution containing at least one halogen and comprising at least one noble metal of the platinum family.

(b) The obtained catalytic mass is dried.

(c) The catalytic mass is calcined and then optionally reduced.

(d) Said mass is contacted with a hydrocarbon solvent and with said organic compound, for example by immersing the mass in a hydrocarbon solvent already containing the organic compound or by immersing the mass in a hydrocarbon solvent and subsequently introducing into the resultant mixture a solution of the organic compound in a hydrocarbon solvent, for example in the solvent wherein the mass has been immersed.

EXAMPLES

The following examples illustrate the invention.

EXAMPLE 1

The treated charge is a $C_6$ cut containing by weight:

| | |
|---|---|
| 49.1% | of normal hexane |
| 40.9% | of isoparaffinic hydrocarbons having 6 carbon atoms (2-methyl pentane and 3-methyl pentane in substantially equal amounts) |
| 8.4% | of methylcyclopentane |
| 1.6% | of cyclohexane |
| 100.0 | |

Six catalysts A to F are prepared which all contain by weight 1.15% chlorine, 0.34% platinum and a variable tin amount, the carrier being alumina having a specific surface of 240 m$^2$/g and a pore volume of 0.57 cc/g. (The final catalysts, after incorporation of platinum and tin, have a specific surface of 230 m$^2$/g and a pore volume of 0.54 cc/g).

Preparation of catalyst A (comparative) containing 0.2% by weight of tin

Catalyst A is prepared by adding to 100 g of alumina 100 cc of an aqueous solution containing:

1.90 g of concentrated HCl (d=1.19), 17 g of an aqueous solution of chloroplatinic acid of 2% by weight platinum content, 1 g of tin acetate solution of 20% by weight tin content.

The contact is maintained for 6 hours and, after water removal and drying for 1 hour at 100°–120° C., the catalytic mass is calcined for 2 hours at 530° C. (in an air stream dried by passage over activated alumina). Then it is reduced in a dry hydrogen stream for 2 hours at 450° C.

The catalyst A, prepared according to a conventional method, not conforming with the invention, contains 0.2 by weight of tin.

Preparation of catalyst C containing 0.2% by weight of tin 100 cc of an aqueous solution containing 1.90 g of concentrated HCl (d=1.19) and 17 g of an aqueous solution of chloroplatinic acid of 2% by weight platinum content are added to 100 g of alumina.

After 6 hours of contact, water is removed and the catalytic mass dried for 1 hour at 100°–120° C. and then calcined for 2 hours at 530° C. in dry air. It is then reduced in a dry hydrogen stream for 2 hours at 450° C.

Then a mass of 50 g of the resultant catalyst is immersed into 150 cc of n-heptane (volume of n $C_7$/catalyst weight=3). Then 1 gram of a solution in n-heptane of tin tetra n-butyl ((n-but)$_4$ Sn) (containing 10% of tin) is introduced into the solution in n-heptane of the platinum catalyst. The contact between the platinum catalyst and the tin tetrabutyl solution in n-heptane is maintained for 6 hours at the heptane reflux temperature. The impregnation solution is discharged and the catalytic mass is washed three times with pure n-heptane at reflux. The catalyst is then dried at 120° C., after solvent removal and charged in a reactor for catalytic test. This catalyst C (calcined and reduced as catalyst A) contains 0.2% by weight of tin.

Preparation of catalyst B containing 0.2% by weight of tin

The preparation of catalyst C is repeated except that the platinum catalyst is not reduced after the calcination step.

Preparation of catalysts D, E and F

Catalyst D contains 0.1% by weight of tin.
Catalyst E contains 0.02% by weight of tin.
Catalyst F contains 0.04% by weight of tin.

These three catalysts are prepared in the same manner as catalyst C, with calcination and reduction of the platinum catalyst, but with the following respective weights of tin tetrabutyl solution:
0.5 g for catalyst D,
0.1 g for catalyst E,
0.2 g for catalyst F.

EXAMPLE 2

Catalysts A to F are subjected to a catalytic reforming test, accompanied with benzene production, conducted in the following operating conditions:
Temperature: 470° C. and 510° C.
Pressure: 10 bars
$H_2$/HC: 3
WHSV: 3

The results are given in the following table, showing the total conversion, the benzene yield and the hydrogen yield.

| CATALYST | | MODE OF PREPARATION | RESULTS ON TEST "C$_6$ CUT" | | | |
|---|---|---|---|---|---|---|
| | % Pt | % Sn | | TEMPERATURE OF TEST (°C.) | CONVERSION (% MOLE) | BENZENE YIELD/ 100 g OF CHARGE | H$_2$ YIELD/ 100 g OF CHARGE |
| A | 0.34 | 0.2 | Conventional method | 470 | 41.0 | 12.5 | 0.20 |
| | | | | 510 | 88.6 | 20.4 | 0.09 |
| B | 0.34 | 0.2 | Sn (But)$_4$ on calcined catalyst | 470 | 49.0 | 12.5 | 0.27 |
| | | | | 510 | 90.4 | 21.5 | 0.13 |
| C | 0.34 | 0.2 | Sn (But)$_4$ on reduced catalyst | 470 | 39.7 | 10.3 | 0.22 |
| | | | | 510 | 82.3 | 17.5 | 0.00 |
| D | 0.34 | 0.1 | Sn (But)$_4$ on reduced catalyst | 470 | 46.7 | 12.1 | 0.17 |
| | | | | 510 | 88.0 | 20.2 | 0.06 |
| E | 0.34 | 0.02 | Sn (But)$_4$ on reduced catalyst | 470 | 63.7 | 17.2 | 0.38 |
| | | | | 510 | 91.9 | 23.9 | 0.30 |
| F | 0.34 | 0.04 | Sn (But)$_4$ on reduced catalyst | 470 | 50.4 | 12.9 | 0.31 |
| | | | | 510 | 91.9 | 22.9 | 0.35 |

EXAMPLE 3

A C$_6$ cut, of the composition given in example 1, is treated in the same operating conditions as in example 2.

Catalysts G and H have been prepared in the same manner as catalyst F, except that n-heptane as impregnation solvent for tin n-tetrabutyl was replaced by methylcyclohexane for catalyst (G) and by toluene for catalyst (H).

The results are reported in the following table:

| catalyst | % Pt | % Sn | temperature of test (°C.) | conversion (% mole) | yield C$_6$H$_6$/100 g of charge | yield H$_2$/100 g of charge |
|---|---|---|---|---|---|---|
| F | 0.34 | 0.04 | 470 | 50.4 | 12.9 | 0.31 |
| | | | 510 | 91.9 | 22.9 | 0.35 |
| G | 0.34 | 0.04 | 470 | 50.3 | 13.1 | 0.33 |
| | | | 510 | 91.8 | 22.8 | 0.34 |
| H | 0.34 | 0.04 | 470 | 50.5 | 12.9 | 0.30 |
| | | | 510 | 91.7 | 23.0 | 0.36 |

EXAMPLE 4

A C$_6$ cut, of the composition given in example 1, is treated in the same operating conditions as in example 2.

The catalysts I and K have been prepared in the same manner as catalyst F, except that tin n-tetrabutyl was replaced by germanium n-tetrabutyl for catalyst I and by lead tetra-ethyl for catalyst K.

Catalysts L and M have been prepared in the same manner as in example 1, except that tin acetate has been replaced by germanium chloride (L) and by lead nitrate (M).

The results are reported in the following table:

| catalyst | % Pt | % 2nd metal | temperature of test (°C.) | conversion (% mole) | yield C$_6$H$_6$/100 g of charge | yield 100 g of charge |
|---|---|---|---|---|---|---|
| F | 0.34 | Sn 0.04 | 470 | 50.4 | 12.9 | 0.31 |
| | | | 510 | 91.9 | 22.9 | 0.35 |
| J | 0.34 | Ge 0.025 | 470 | 50.2 | 12.8 | 0.30 |
| | | | 510 | 91.7 | 22.6 | 0.33 |
| K | 0.34 | Pb 0.07 | 470 | 50.5 | 12.8 | 0.31 |
| | | | 510 | 92.0 | 22.8 | 0.34 |
| L | 0.34 | Ge 0.12 | 470 | 40.8 | 12.4 | 0.19 |
| | | | 510 | 88.2 | 20.2 | 0.09 |
| K | 0.34 | Pb 0.35 | 470 | 40.5 | 12.2 | 0.18 |
| | | | 510 | 88.0 | 20.1 | 0.08 |

What is claimed as the invention is:

1. A process for manufacturing a hydrocarbon conversion catalyst which comprises the steps of:
    (a) impregnating a carrier with an acid solution containing at least one halogen or halogen compound and at least one compound of a noble metal of the platinum family,
    (b) drying the resultant impregnated carrier,
    (c) calcining the resultant dried impregnated carrier,
    (d) contacting the resultant calcined impregnated carrier with a solution of at least one organic compound selected from the group consisting of alkyl, cycloalkyl, aryl, alkylaryl and arylalkyl tin, germanium and lead compounds and halogenated derivatives thereof, in a hydrocarbon solvent selected from the group consisting of paraffinic, naphthenic and aromatic hydrocarbons containing 6 to 12 carbon atoms per molecule, said compound of a noble metal of the platinum family, said halogen or halogen compound, and said at least one organic compound being used in such proportions as to result in a catalyst containing 0.01 to 2% by weight of said noble metal of the platinum family, 0.005 to 0.1% by weight of said additional metal and 0.1 to 15% by weight of halogen and
    (e) drying the thus prepared catalyst.

2. A process according to claim 1, wherein step (d) comprises immersing the catalytic mass into a hydrocarbon solvent and then introducing into said solvent said solution of said at least one organic compound in a hydrocarbon solvent.

3. A process according to claim 2, wherein the hydrocarbon solvent of step (d) for said at least one organic compound is the same as the hydrocarbon solvent in which said catalytic mass is immersed.

4. A process according to claim 1, wherein the additional metal is tin.

5. A process according to claim 1, wherein, in step (c), the catalytic mass, after calcination, is reduced with hydrogen.

6. A hydrocarbon conversion catalyst prepared by the process of claim 1.

7. A process according to claim 1, wherein the hydrocarbon solvent is n-heptane.

8. A process according to claim 1, wherein the hydrocarbon solvent is methylcyclohexane.

9. A process according to claim 1, wherein the hydrocarbon solvent is toluene.

10. A hydrocarbon conversion catalyst according to claim 1 containing not more than 0.04% by weight of said additional metal.

11. A hydrocarbon conversion catalyst according to claim 1 containing not more than 0.02% by weight of said additional metal.

12. A hydrocarbon conversion catalyst according to claim 6 wherein the noble metal of the platinum family is platinum and the additional metal is tin.

13. A catalyst according to claim 12 wherein the tin compound employed in the impregnation solution is n-tetrabutyl tin.

* * * * *